(12) United States Patent
Proehl

(10) Patent No.: US 6,614,844 B1
(45) Date of Patent: Sep. 2, 2003

(54) METHOD FOR WATERMARKING A VIDEO DISPLAY BASED ON VIEWING MODE

(75) Inventor: Andrew M. Proehl, San Francisco, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 448 days.

(21) Appl. No.: 09/712,317

(22) Filed: Nov. 14, 2000

(51) Int. Cl.[7] .......................... H04N 7/12; H04N 11/02; H04N 11/04
(52) U.S. Cl. ...................... 375/240.08; 386/83; 386/95; 725/32
(58) Field of Search ...................... 375/240.08; 386/68, 386/94, 95, 83; 725/32; H04N 7/04, 7/08

(56) References Cited

U.S. PATENT DOCUMENTS 5,181,114 A * 1/1993 Richards et al. .............. 725/32

FOREIGN PATENT DOCUMENTS

EP          0 447 050 A2 *    9/1991    ............ H04N/7/00

* cited by examiner

Primary Examiner—Howard Britton
(74) Attorney, Agent, or Firm—Rader, Fishman & Grauer PLLC; Ronald P. Kananen

(57) ABSTRACT

A format to be used with the MPEG-4 standard alters the way video content is displayed on a screen based on whether the content is played in a normal playback mode or a fast playback mode by "watermarking" different or additional visual content onto the original video data stream. Metadata is included in the format to instruct a server to change the video display during fast playback by, for example, adding advertising information, closed captioning, scene summaries, help data, or station identification to the original image, either in a separate section of the screen or superimposed on the original image.

18 Claims, 3 Drawing Sheets

NORMAL PLAY

FAST FWD.

NORMAL PLAY

FAST FWD.

NORMAL PLAY

FAST FWD.

NORMAL PLAY

FAST FWD.

NORMAL PLAY

FAST FWD.

NORMAL PLAY

FAST FWD.

METHOD FOR WATERMARKING A VIDEO DISPLAY BASED ON VIEWING MODE

TECHNICAL FIELD

The present invention relates to a video display method and format, and more particularly to a video display method and format that changes a video display during a fast playback mode.

BACKGROUND ART

Current technology has provided television and video viewers with many viewing options, including the ability to fast-forward past commercials or program portions that are not of interest to the viewer. Fast-forwarding tends to cause some problems for both advertisers and viewers, however. With respect to advertisers, the visual content of commercials progresses too quickly in a fast-forward or rewind mode for viewers to see the name/logo of the product being advertised. With respect to viewers, fast-forwarding or rewinding (collectively referred to as "fast playback") makes it more difficult for viewers to ascertain station/broadcaster information or scene information. Although the video data itself could be altered so that information appears during a fast playback mode, alteration of the video data is impractical and may adversely affect image quality when the video data is played during normal playback mode.

There is a need for a system that can provide viewer information when the visual content is being viewed in a fast playback mode without requiring extensive modification of the video's encoding format.

SUMMARY OF THE INVENTION

Accordingly, the present invention takes advantage of the additional flexibility provided by an MPEG-4 standard by including metadata that varies the visual content on a screen based on the playback mode. More particularly, the format according to the invention has a main video potion that includes primary content data to be displayed during a normal viewing mode and a metadata portion that includes watermark data corresponding to the primary content data and instructions for displaying the watermark data during a modified mode, such as a fast playback (e.g., fast forward or fast reverse) mode.

The watermark data itself can be any information that a program producer or advertiser wishes to be displayed when the program is played in the modified playback mode. The watermark can be displayed in any manner, such as by superimposing the watermark over the primary program content, removing the primary program and displaying the watermark by itself, or displaying the watermark in one portion of the screen and the primary program content in the remaining portion of the screen.

DETAILED DESCRIPTION OF THE PREFERRED EMBODIMENTS

The Motion Pictures Expert Group-4 ("MPEG-4") standard provides a way to store "metadata", or information that describes other data or includes instructions on how to deliver media objects. This metadata capability provides video display flexibility that was previously unavailable with other standards. For clarity, the characteristics of the MPEG-4 standard that are relevant to implementation of the invention will be described below with reference to FIGS. 1 and 2.

Figure 1:
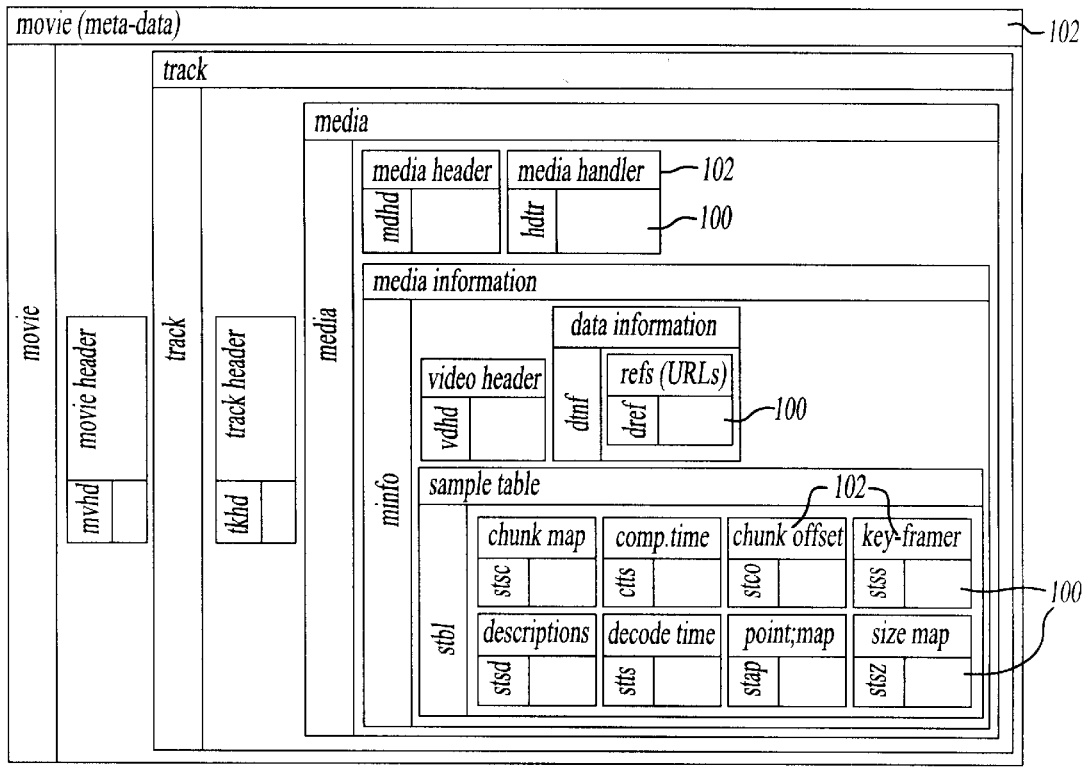
FIG. 1 is a diagram illustrating a relationship between object-oriented structures according to the MPEG-4 standard.

Generally, MPEG-4 standardizes and organizes primitive media objects (e.g. still images, video objects, audio objects, etc.) so that the media objects can be represented and modified independently of its surroundings and background, allowing greater flexibility and functionality in both scene construction and playback. As shown in FIG. 1, the MPEG-4 standard includes object-oriented structures called "atoms" 100 and unique tags 102 identifying each atom. Many of the tags 102 describe a hierarchy of "metadata", which provide information about the actual media objects/content data, such as index points, durations, and pointers. The media objects themselves can be located in the MPEG-4 file itself, in one or more media data atoms 100, or outside the MPEG-4 file for reference via URL's.

The MPEG-4 file format is a streamable, as opposed to streaming, format; the file format does not define an on-the-wire protocol and is never actually streamed over a transmission line. Instead, the metadata includes data that provides content delivery instructions by telling a server application how to deliver the content over a particular delivery protocol. The file can include multiple hint tracks for one presentation to provide instructions on how to deliver the content over different delivery protocols.

Figure 2:
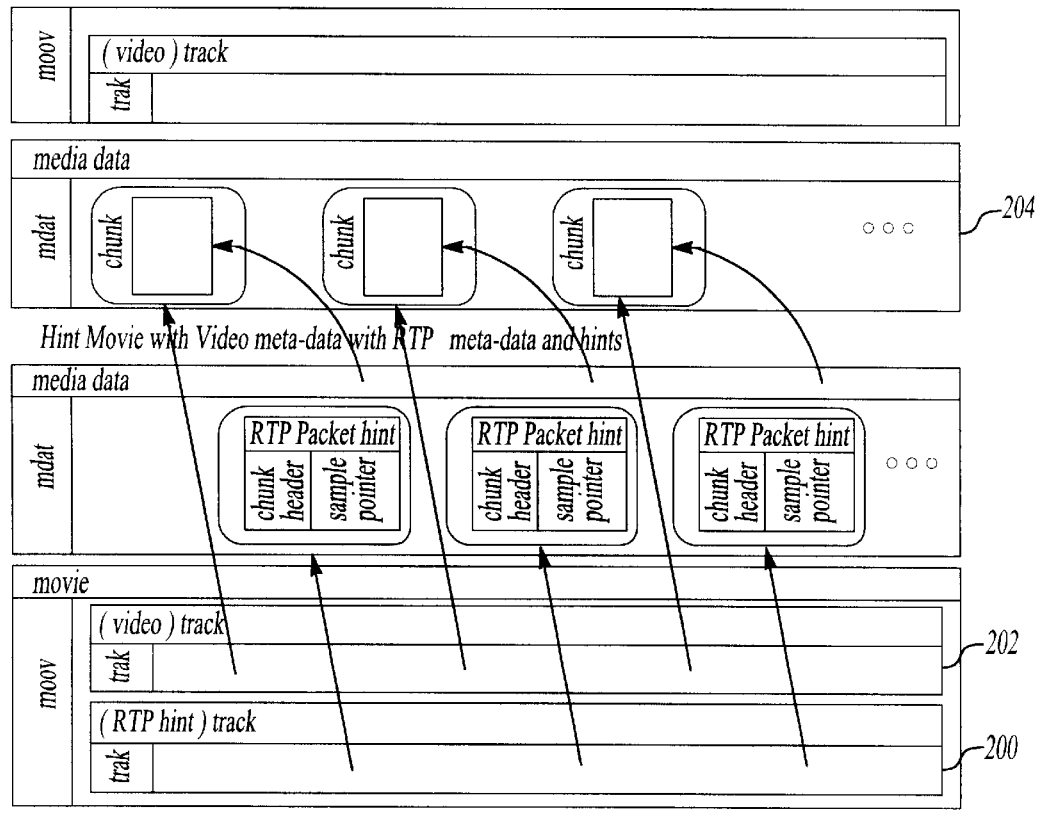
FIG. 2 shows a relationship between content data and hint tracks for a movie according to the MPEG-4 standard.

FIG. 2 shows one example of a relationship between the content data and RTP protocol hint tracks for streaming a simple movie that only has video data (i.e., no audio data). As can be seen in the Figure, an RTP hint track 200 and a video track 202 direct a server to specific locations of the media data 204 such that the media data 204 is delivered to an output in discrete sections. Of course, the use of metadata in the MPEG-4 standard is not limited to the examples shown above; metadata can include any data that corresponds to other data in the video stream and/or instructions for presenting the data. The metadata, combined with the flexible data storage options provided by the MPEG-4 standard, allows the format to support streaming, editing, local playback, and content interchange.

The present invention takes advantage of the flexibility provided by the MPEG-4 standard by including metadata that alters the way content is displayed on a video screen according to whether the content is displayed during a normal playback mode or a modified playback mode, such as a fast-forward playback mode. Generally, the invention encodes or "watermarks" different or additional video content separately from the original video stream and decodes the different or additional video content at an output, such as a television or set-top box, when selected criteria, such as information corresponding to a specific program or commercial played in a specific playback mode, are met.

Figure 3A:
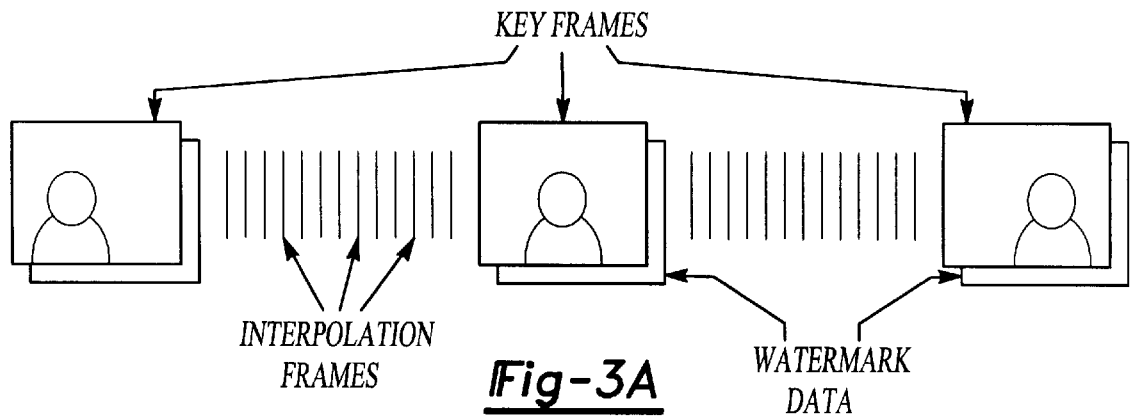
FIGS. 3A through 3F are representative examples of ways in which the inventive format can be used to alter a screen display.
Figure 3B:
Figure 3B:
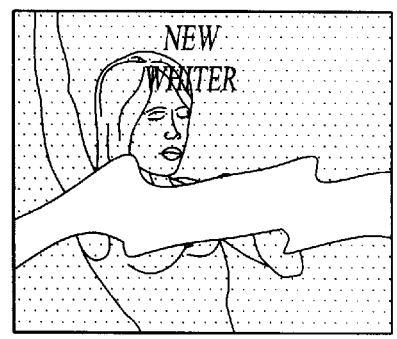
Figure 3C:
Figure 3C:
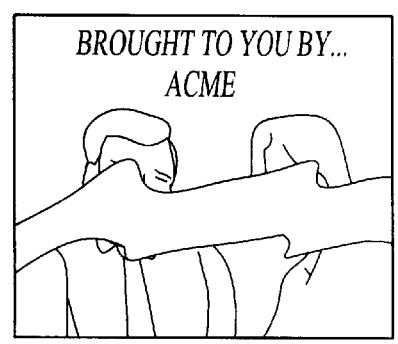
Figure 3D:
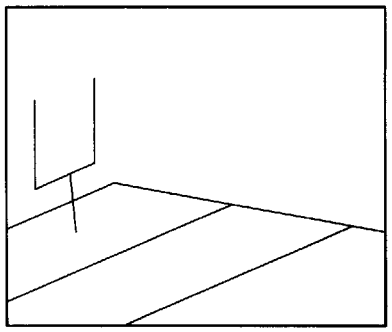
Figure 3D:
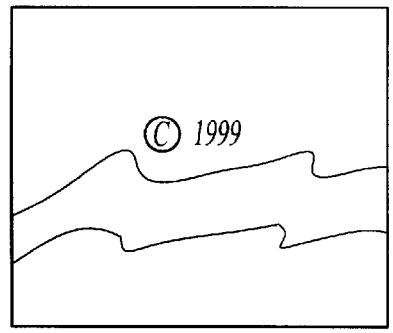
Figure 3E:
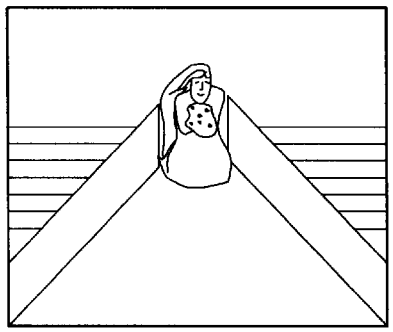
Figure 3E:
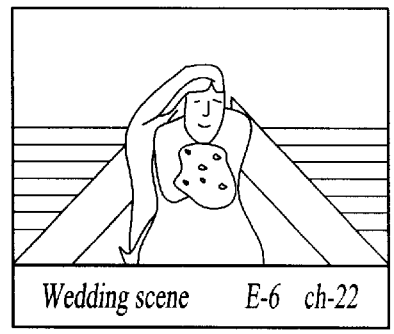
Figure 3F:
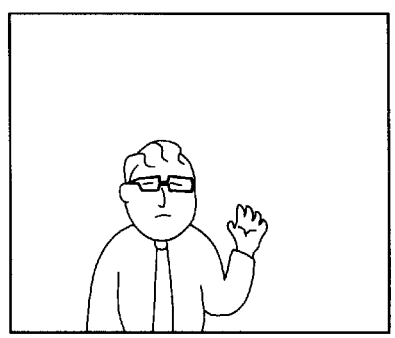
Figure 3F:
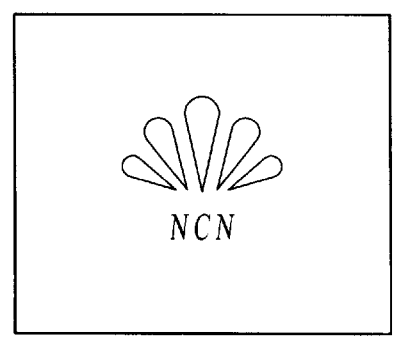

FIGS. 3A through 3F illustrate possible ways in which the metadata can be used to watermark the primary video content in a fast playback mode (in these examples, a fast forward mode). These examples are not meant to be an exhaustive list; the inventive format can accommodate any combination of data, logos, and programming as long as the format includes instructions for changing the display when the playback mode changes. For example, watermark data can be added to selected key frames in the video stream to act as bookmarks for those selected frames so they can be easily located during fast playback (FIG. 3A). A watermark can also be superimposed onto a commercial when the commercial is played in a fast playback mode (FIG. 3B). Similarly, a watermark can be superimposed onto a television program to indicate the program's sponsorship when the program is played in a fast-forward mode (FIG. 3C). Intellectual property information, such as copyright ownership (FIG. 3D), or broadcaster identification (FIG. 3F) can also be superimposed onto a program or simply displayed on the screen alone. Alternatively, the watermark can be displayed in a letterbox area of the display so that the program is not obscured (FIG. 3E). Other possible watermarks can include credit information, closed-captioning, or any other information that may be considered useful for display during a modified playback mode.

The watermark data itself can be simple text data that is transmitted along with the primary content data in the video stream. Preferably, the text data is large enough and is displayed on the screen long enough so that it can be easily seen by the viewer; both of these variables can be controlled by metadata that includes the watermark data itself and instructions on how and when the watermark data is to be displayed. To enhance the appearance of the watermark data when it is displayed, the metadata may also instruct a set top box to display graphic data (e.g. graphic logos stored in the set top box) as the watermark data. Although graphic data and instructions for displaying the data can be sent via the video stream, accessing graphic data that is already stored in the set top box uses bandwidth more efficiently in many cases by limiting the amount of data transmitted in the stream.

The present invention therefore takes advantage of the display flexibility offered by the MPEG-4 standard by including metadata that instructs a playback apparatus to alter the video display during a modified playback viewing mode, such as a fast playback mode. The invention therefore provides a way to provide usable viewer content even during a fast playback mode, during which the regular video content may progress too quickly to provide any meaningful information.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A encoding format for displaying varying visual content on a screen based on a viewing mode, comprising:
    a main video portion having primary content data to be displayed during a normal viewing mode; and
    a metadata portion having watermark data corresponding to the primary content data and instructions for displaying the watermark data during a modified playback viewing mode.

2. The format of claim 1, wherein the format is an MPEG-4 format.

3. The format of claim 2, wherein during the modified playback viewing mode, the primary content data is removed from the screen and the watermark data is displayed on the screen.

4. The format of claim 2, wherein during the modified playback viewing mode, the primary content data is displayed on a first portion of the screen and the watermark data is displayed on a second portion of the screen.

5. The format of claim 2, wherein during the modified playback viewing mode, the primary content data is displayed on the screen and the watermark data is superimposed on the primary content data.

6. The format of claim 2, wherein the watermark data is at least one of text data and graphic data.

7. The format of claim 2, wherein the secondary data includes instructions for displaying at least one of text data and graphic data stored in a remote location.

8. The format of claim 7, wherein the remote location is a set-top box.

9. The format of claim 1, wherein the modified playback viewing mode is a fast playback mode.

10. A method for displaying varying visual content from a video stream on a screen based on a viewing mode, comprising the steps of:
    displaying a main video portion that includes primary content data during a normal viewing mode;
    detecting a modified playback viewing mode; and
    displaying a watermark corresponding to the primary content data during a modified playback viewing mode, wherein the watermark and instructions for displaying the watermark are stored in metadata in the video stream.

11. The method of claim 10, wherein the video stream complies with an MPEG-4 standard.

12. The method of claim 11, wherein during the modified playback viewing mode, the primary content data is removed from the screen and the watermark data is displayed on the screen.

13. The method of claim 11, wherein during the modified playback viewing mode, the primary content data is displayed on a first portion of the screen and the watermark data is displayed on a second portion of the screen.

14. The method of claim 11, wherein during the modified playback viewing mode, the primary content data is displayed on the screen and the watermark data is superimposed on the primary content data.

15. The method of claim 11, wherein the watermark data is at least one of text data and graphic data.

16. The method of claim 11, wherein the secondary data includes instructions for displaying at least one of text data and graphic data stored in a remote location.

17. The method of claim 16, wherein the remote location is a set-top box.

18. The method of claim 10, wherein the modified playback viewing mode is a fast playback mode.

* * * * *